May 13, 1930. L. HAUBERT 1,758,744
COMBINATION HOOK
Original Filed Feb. 7, 1928
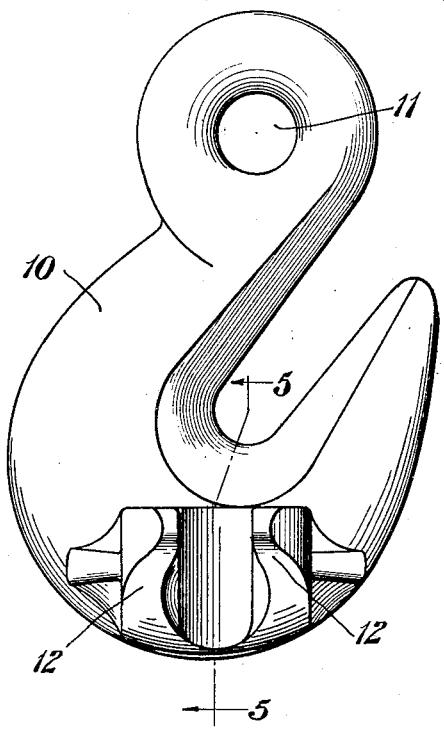
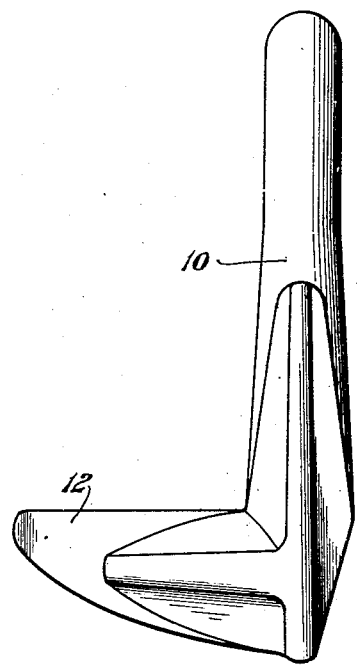
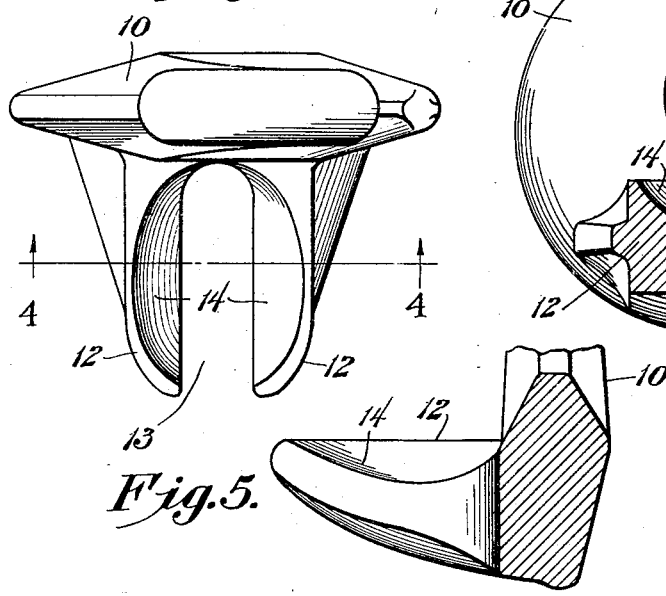
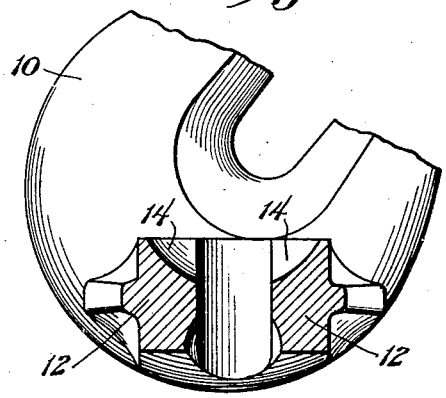
INVENTOR
Leo Haubert,
BY
Liggers + Adams
ATTORNEYS Patented May 13, 1930

1,758,744

UNITED STATES PATENT OFFICE

LEO HAUBERT, OF TULSA, OKLAHOMA, ASSIGNOR OF ONE-EIGHTH TO LYMAN LEROY ROLLER, OF TULSA, OKLAHOMA

COMBINATION HOOK

Application filed February 7, 1928, Serial No. 252,620. Renewed November 23, 1929.

This invention relates to chain hooks and aims, among other objects, to provide an improved combination hook having provision for engaging a taut chain. This application relates to the type of compound link shown and described in my co-pending application, Serial No. 183,863, filed April 14, 1927 and entitled Load binder.

In the accompanying drawing,

Fig. 1 is a side elevation of a combination hook embodying the invention;

Fig. 2 is an elevational view taken at right angles to Fig. 1;

Fig. 3 is a top plan view;

Fig. 4 is a cross sectional view taken on the line 4—4 of Fig. 3; and

Fig. 5 is a sectional view taken on the line 5—5 of Fig. 1.

In applying plain hooks to the links of chains, it is necessary to leave considerable slack in the chain after the link is seated in the bottom of the hook. This slackness of the chain necessarily involves lost motion when the hook is moved to tighten the chain. It is highly desirable to provide means on a plain hook to engage a chain especially when the hook is applied to load binders and the like wherein the movement of the hook to tighten the chain is quite limited. This invention therefore aims to provide such means on one side of an ordinary chain hook.

Referring particularly to the drawings, there is shown a plain hook 10 having an eye 11 adapted to be connected to an ordinary chain link and, at the lower end of the hook on one side, there is shown a pair of prongs 12 cast integral therewith and extending at right angles to its plane. Herein, the prongs are spaced apart to provide a chain link receiving bifurcation 13 for receiving a link inserted edgewise therein and the upper faces or edges of the prongs are dished out or curved at 14 to conform more or less to the curvature of the end of the next chain link and provide a seat therefor. Referring to Fig. 4, the curvature in cross section is shown as being substantially circular or arcuate. Further, the curvature longitudinally of the prong faces is such that the end of a link which engages the faces will automatically slide to and seat itself in the bottom of the curved portion near the main body of the hook. Thus, the complemental curved or dished seats will prevent a chain link from becoming disengaged from the prongs when lifting or tightening pressure is applied and when the main hook is tilted slightly to one side.

Referring to Figs. 1 and 2, it will be noted that the distance from the eye 11 to the bifurcation formed by the prongs is such that only a slight tilting of the hook will be entailed by applying the load to the prongs instead of the main hook. The width of the prongs is such that they will engage any ordinary chain link used for handling heavy work; that is to say, the maximum width is not greater than the length of the straight portion of the links to be engaged. Moreover, the prongs are shown as presenting tapered ends to facilitate engagement with a link.

There are situations where the ordinary chain hook is desirable especially when slight lost motion due to slackness of the chain made by inserting a link in the hook is of no consequence. However, in many cases it is highly desirable to be able to engage a chain link in such way that it may be kept sufficiently tight to avoid undue lost motion. It can be readily seen that the lateral prongs will accomplish this result whereas the plain hook would entail lost motion equal to the length of one or more links of the chain. Moreover, the prongs can be made integral with the hook without excessive expense and either one or the other may be used without interference by the other.

It has been found that this combination hook is very useful in connection with load binders wherein the hook is caused to take a series of bites on a tight chain to bind a load of logs or other material. Furthermore, the auxiliary prongs may be used to engage the end link of a chain when the main hook cannot reach it.

Obviously, this invention is not limited to the particular embodiment thereof herein shown and described.

What is claimed is:—

1. In combination with a chain hook having an eye and an open bight portion, lateral prongs integral therewith and providing a link receiving bifurcation at approximately a right angle to the plane of the bight portion.

2. In combination with a chain hook having a bill providing a link receiving bight portion, a pair of separated parallel prongs extending approximately at right angles to the plane of the bight portion and also having provision for receiving a chain link between them and for engaging the end of the next adjacent link.

3. In combination with a hook, a pair of separated prongs integral with the lower end of the hook having a provision for receiving a chain link between them; said jaws having curved faces to engage the end of the adjacent chain link.

4. In combination with a chain hook, a pair of spaced link receiving prongs projecting laterally therefrom and integral therewith; said prongs presenting curved link engaging faces and having upwardly inclined lower edges from the hook to the outer ends thereof.

5. A chain hook having a pair of link receiving prongs projecting therefrom and integral therewith; said prongs having upper faces curved both transversely and longitudinally to present a seat for the end of a chain link and prevent it from sliding off the ends of the prongs.

6. A chain hook of the character described having a pair of spaced prongs projecting laterally therefrom and at right angles thereto; said prongs being longitudinally tapered to engage a chain link and presenting cupped faces providing a link receiving seat.

In testimony, that I claim the foregoing as my own, I have hereto affixed my signature.

LEO HAUBERT.